(12) United States Patent
Mela

(10) Patent No.: US 6,570,128 B1
(45) Date of Patent: May 27, 2003

(54) GENERATOR FOR ARC WELDING MACHINES

(75) Inventor: Franco Mela, Piazzola sul Brenta (IT)

(73) Assignee: Selco S.r.l., Onara di Tombolo (IT)

( * ) Notice: Subject to any disclaimer, the term of this patent is extended or adjusted under 35 U.S.C. 154(b) by 424 days.

(21) Appl. No.: 09/614,560

(22) Filed: Jul. 12, 2000

(30) Foreign Application Priority Data

Jul. 12, 2000 (IT) .......................................... PD99A0159

(51) Int. Cl.⁷ ................................................. B23K 9/10
(52) U.S. Cl. .................................................. 219/130.1
(58) Field of Search ..................... 219/130.1, 130.32, 219/130.33, 130.51, 137 PS; 363/89, 125, 132

(56) References Cited

U.S. PATENT DOCUMENTS 5,822,203 A * 10/1998 Peron .......................... 363/125
6,023,037 A * 2/2000 Church et al. ................. 363/89
6,115,267 A * 9/2000 Herbert ....................... 363/132

FOREIGN PATENT DOCUMENTS

| EP | 0 449 467 | 10/1991 |
| EP | 0 602 495 | 6/1994 |
| WO | 97 01211 | 1/1997 |

* cited by examiner

Primary Examiner—Clifford C. Shaw
(74) Attorney, Agent, or Firm—Guido Modiano; Albert Josif; Daniel O'Byrne

(57) ABSTRACT

A generator for arc welding machines provided with an input rectifier stage which has a unit power factor and comprises an inductor, on the mains side, two diodes and two electronic switches, one for each diode, which are driven by a driver which renders the absorption of the input rectifier stage practically sinusoidal.

5 Claims, 4 Drawing Sheets

GENERATOR FOR ARC WELDING MACHINES

BACKGROUND OF THE INVENTION

The present invention relates to a generator for arc welding machines which has an input rectifier stage capable of absorbing a practically sinusoidal current from the AC mains power supply.

The generator according to the invention is of the electronic type.

According to the state of the art, a classic layout for a generator for arc-welding machines is the one shown in FIG. 1, which provides for the presence of a rectifier stage 1 followed by a block 2 with clamping capacitors to which an inverter block with high-frequency electronic switches 3 is connected; the inverter block drives a transformer 4 whose secondary winding supplies a rectifier stage 5 which, by means of an inductor 6 for clamping the output current, supplies a welding arc 7.

A generator of this type absorbs from the mains, during operation, a current whose waveform has a high harmonic content, such as the one shown in FIG. 2.

With a waveform of this type a low power factor is obtained, i.e., if a high useful power level in output is required, it is necessary to absorb a high RMS current from the mains.

This entail considerable problems on the mains power supply, since the high harmonic content in the absorbed current limits the power that can be delivered by the generator, and this is a severe shortcoming particularly during use at sites with low available power, such as those served by domestic services.

This arises from the fact that the high intensity of RMS current absorbed by the generator causes the activation of the thermal protection of the system even though the useful power in output is lower than that of an equivalent resistive load.

In order to obviate these problems, welding generators have been devised which have auxiliary electronic stages which allow sinusoidal absorption of current on the mains side, so as to render the generator equivalent to a resistive load.

In this manner it is possible to absorb all the available active power.

A typical diagram of a generator according to this configuration is shown in FIG. 3, which shows, with respect to the diagram of FIG. 1, the addition of a stage, designated by the reference numeral 7, which is interposed between the rectifier block and the clamping block.

This stage, known as BOOST-type PFC, comprises an inductor 71, an electronic switch 72 and a diode 73 arranged as shown.

The switch 72 is controlled by means of an appropriate block 74 which allows to render the absorption of the generator sinusoidal, as plotted in FIG. 4.

Evidently, however, the introduction of this block entails a considerable increase in the components, and therefore in the costs, of the generator.

Additionally, the increase in components causes a reduction in efficiency due to the increased losses in the semiconductor devices.

SUMMARY OF THE INVENTION

The aim of the present invention is to provide a generator for arc-welding machines which overcomes the above-cited problems, particularly as regards the optimization of operation and efficiency.

Within the scope of this aim, a primary object of the present invention is to provide a circuit for the generator which reduces the number of electronic components, in order to reduce costs and improve efficiency.

These and other objects which will become better apparent hereinafter are achieved by a welding generator comprising a current transformer with a primary winding and a secondary winding, which supplies, at the secondary winding, a welding arc, a primary winding of said transformer being supplied by an inverter block with high-frequency electronic switches preceded by a block of clamping capacitors, said capacitors being supplied by an input rectifier stage, characterized in that said input rectifier stage has a unit power factor and is composed of at least one inductor, on a mains side, and of at least two diodes and at least two electronic switches, one for each diode, said switches being driven by a driver which renders the absorption of the input rectifier stage practically sinusoidal.

BRIEF DESCRIPTION OF THE DRAWINGS

Further characteristics and advantages of the present invention will become better apparent from the following detailed description of a preferred embodiment thereof, illustrated only by way of non-limitative example in the accompanying drawings, wherein.

DESCRIPTION OF THE PREFERRED EMBODIMENTS

With reference to the accompanying drawings, the generator according to the present invention is shown in FIGS. 5 to 8.

Figure 5:
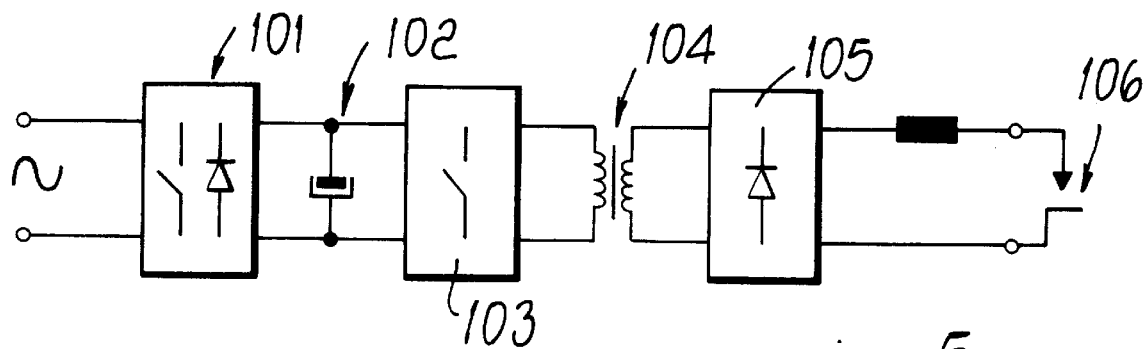
FIG. 5 is a block diagram of the generator according to the present invention.

The generator is composed of a set of blocks which in FIG. 5 are designated as input rectifier stage 101, capacitor clamping stage 102, inverter stage with fast electronic switches 103, current transformer 104, and power supply stage 105 for the welding arc 106.

Figure 6:
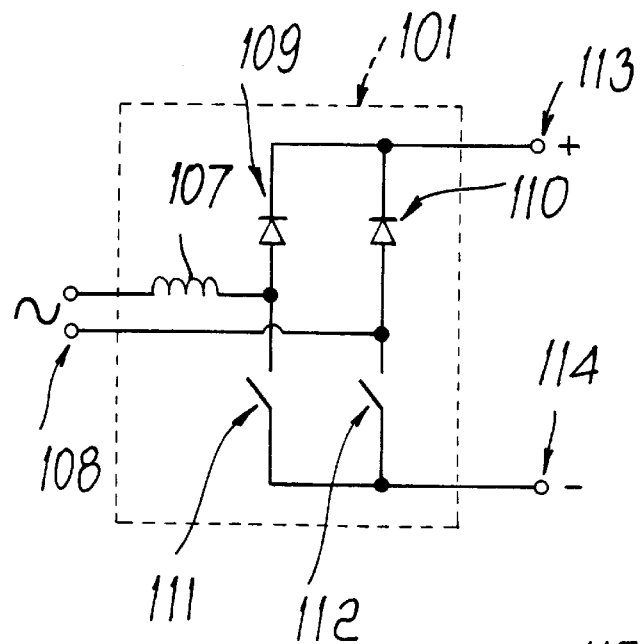
FIG. 6 is a simplified diagram of the input rectifier stage of the generator of FIG. 5, in the case of single-phase power supply.
Figure 7:
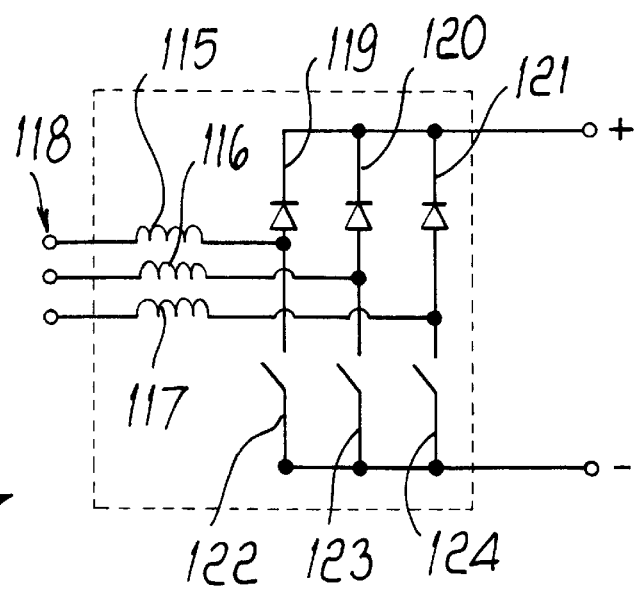
FIG. 7 is a simplified diagram of the input rectifier stage of the generator of the kind shown in FIG. 5, in the case of three-phase power supply.
Figure 8:
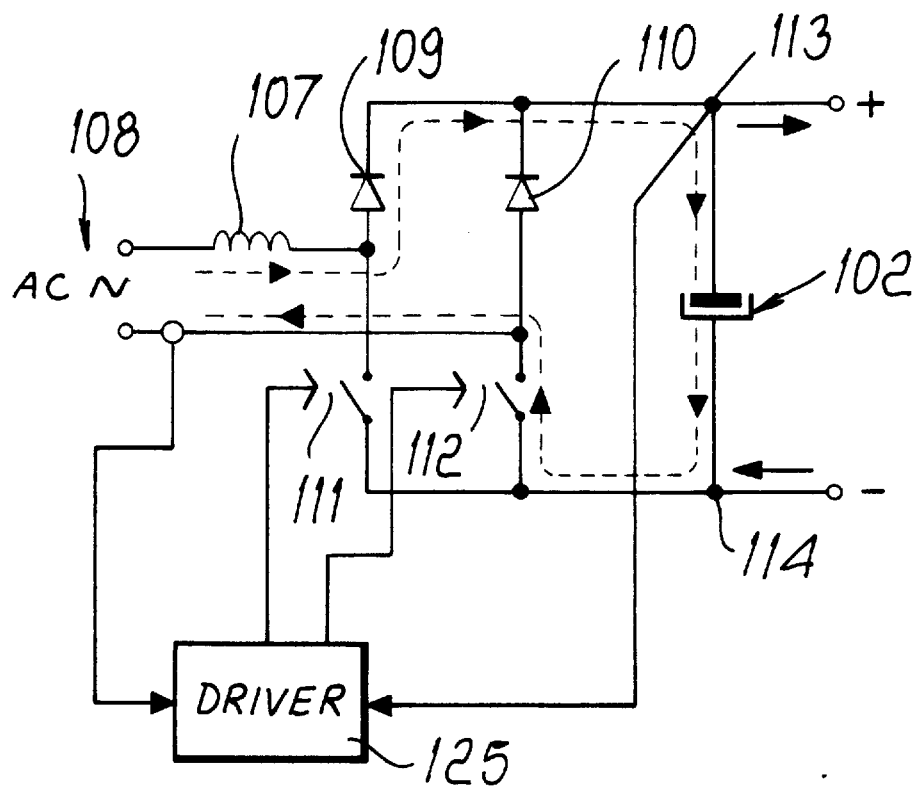
FIG. 8 is a detailed diagram of the stage of FIG. 6, illustrating the path of the current.

The part that characterizes the generator lies in the input rectifier stage 101, which is shown in detail in FIGS. 6, 7 and 8.

In FIG. 6, the input stage 101 is shown in a first detail and relates to a generator with single-phase power supply.

In this circuit configuration there is provided an inductor 107 which is directly connected to the mains input 108.

The inductor 107 is followed by two diodes 109 and 110 which are interconnected in opposition, each diode being served by an electronic switch, respectively designated by the reference numerals 111 and 112.

The outputs 113 and 114 supply the clamping capacitor stage 102.

In the case of a three-phase power supply, as shown in FIG. 7, there are three inductors, one for each phase, which are designated by the reference numeral 115, 116 and 117 and are directly connected to the mains 118.

Each one of the inductors is followed by a respective diode 119, 120 and 121, each of which is served by an electronic switch, designated by the reference numerals 122, 123 and 124 respectively.

FIG. 8 shows in greater detail the structure of the input rectifier stage, further illustrating the driver 125 which acts on the switches 111 and 112.

As shown by the path traced in dashed lines, the current (in one of the operating steps) flows across the inductor 107, the diode 109, the capacitors 102 and the switch 112, which is closed.

A similar path occurs when the switch 111 is closed and the diode 110 conducts.

Figure 1:
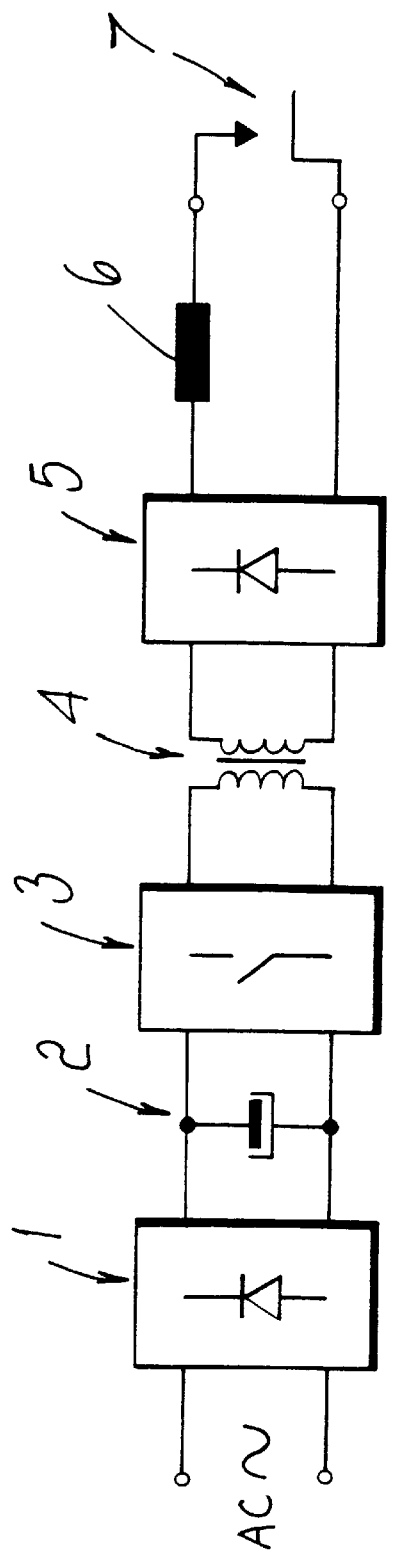
FIG. 1 is a typical block diagram of a generator for welding machines, with mains-side absorption characterized by the presence of strong harmonics.
Figure 2:
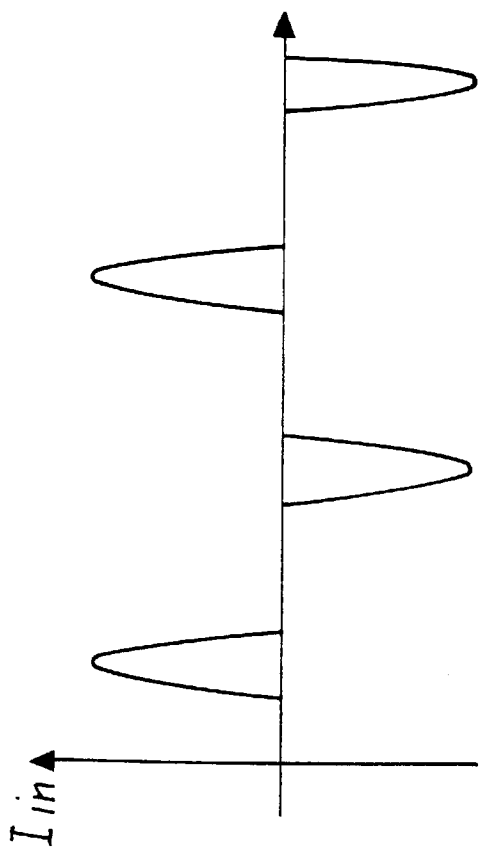
FIG. 2 plots the current absorbed by the generator of FIG. 1.
Figure 3:
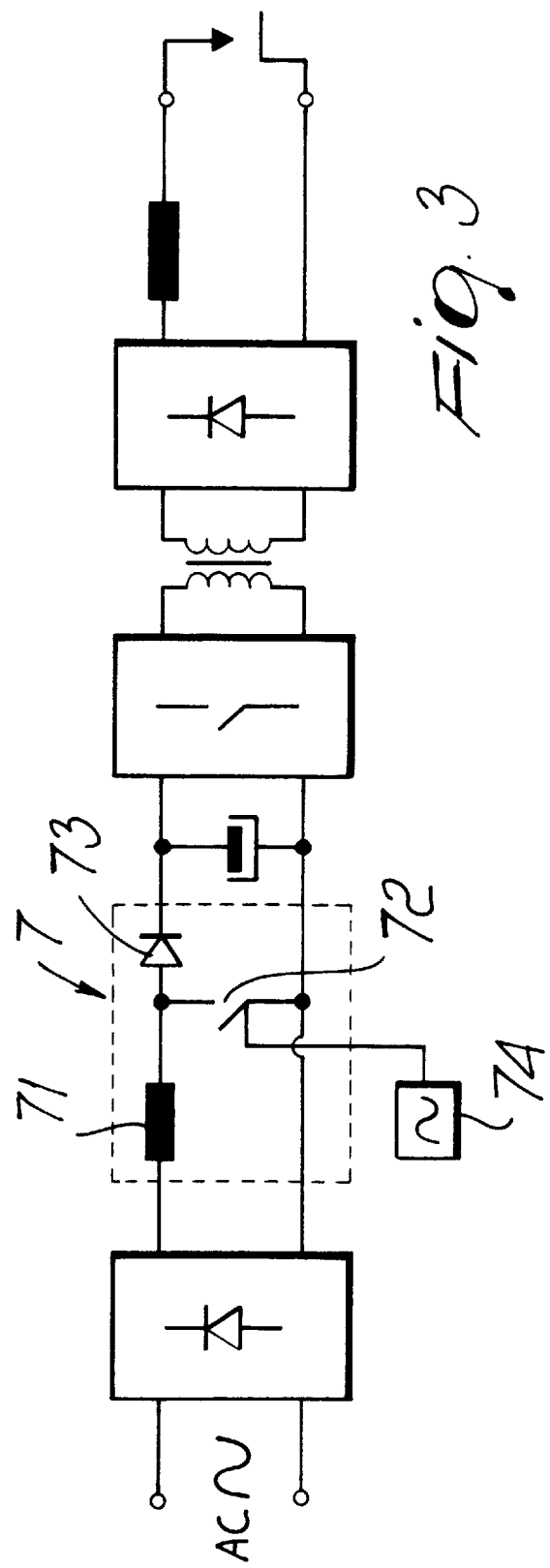
FIG. 3 is a typical block diagram of a generator according to the state of the art, with a control stage for absorbing, on the mains side, current with a sinusoidal waveform.
Figure 4:
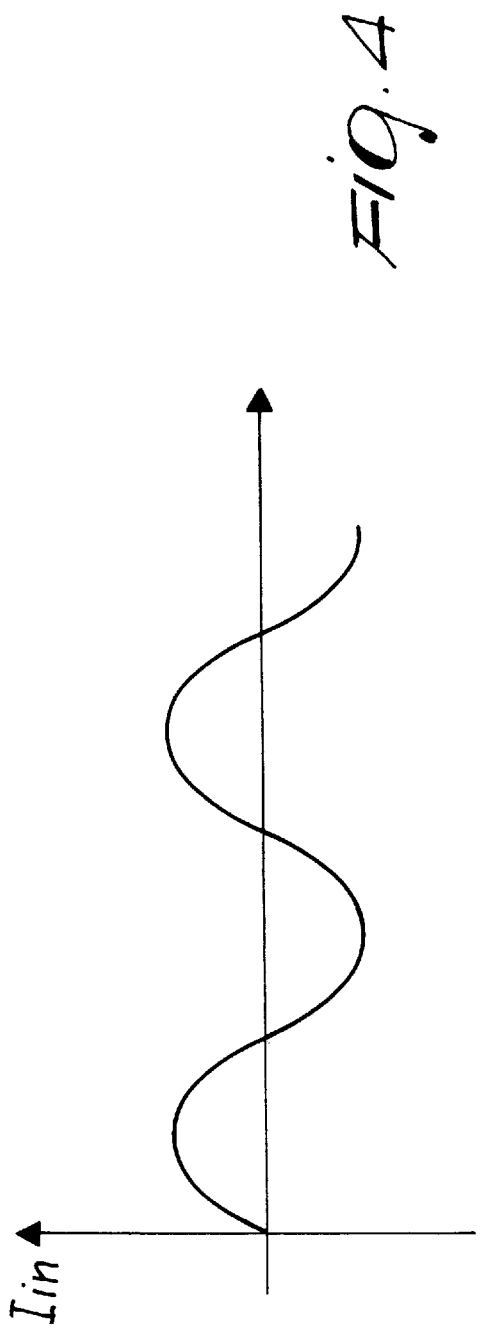
FIG. 4 plots the current absorbed by the generator of FIG. 3.
Figure 9:
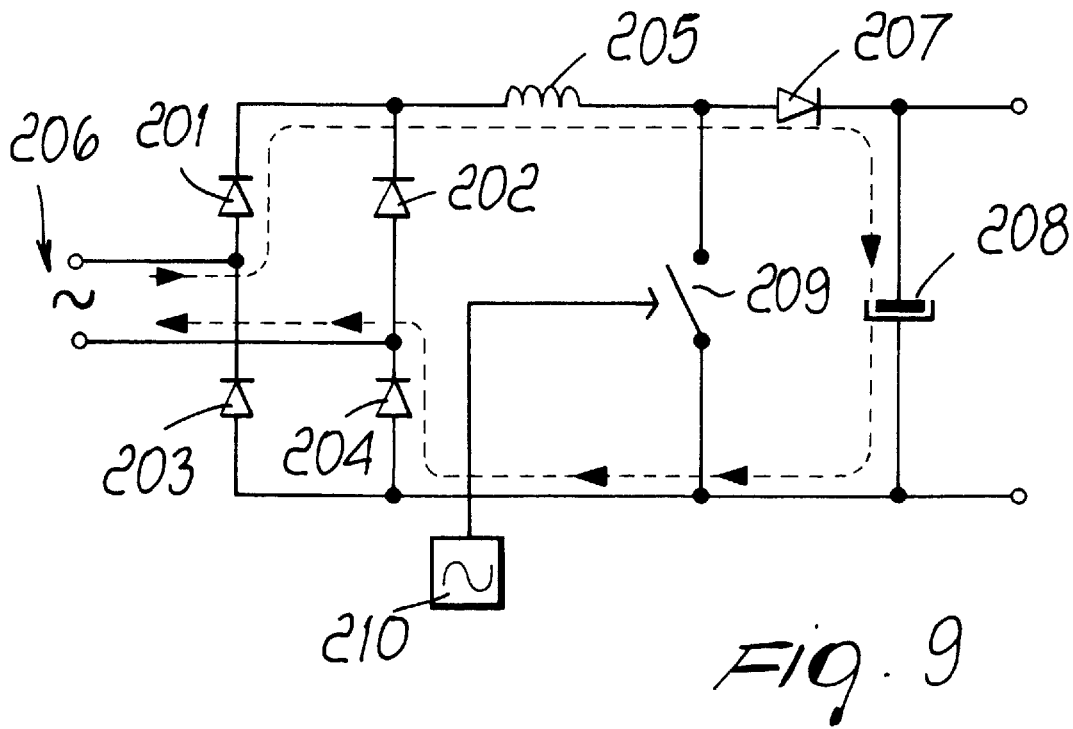
FIG. 9 is a detailed diagram of the rectifier stage and of the control stage of a conventional generator, of the type shown in FIG. 3, illustrating the path of the current, for comparison with what is shown in FIG. 8.

FIG. 9 shows the circuit that corresponds to the generator of FIG. 3, which comprises a rectifier bridge with four diodes 201, 202, 203 and 204, an inductor 205 located downstream of the bridge with respect to the mains input 206, a further diode 207, a clamping capacitor 208 and a switch 209 controlled by a driver 210.

In the illustrated conduction step, the current flows across the diode 201, the diode 207, the capacitors 208 and the diode 204.

As clearly shown by comparing the path of the current in the two circuits, in the circuit according to the invention the current passes through only two semiconductor devices, against the three of the circuit executed according to the prior art.

In terms of components, although an extra fast switch is added, the diodes are reduced to two, against the five provided in the circuit executed according to the prior art.

The reduction in the number of semiconductor devices on the one hand reduces the cost of the generator and on the other hand increases the efficiency thereof, since there are lower losses on the semiconductors because of their smaller number.

From the above description and the drawings, it is evident that the intended aim and object have been achieved and that in particular a generator for welding has been provided which has sinusoidal absorption on the mains side and offers improved efficiency and a low cost.

The materials and the components may of course be any according to the size of the generator.

The disclosures in Italian Patent Application No. PD99A000159 from which this application claims priority are incorporated herein by reference.

What is claimed is:

1. A generator for arc welding machines comprising a current transformer with a primary and a secondary winding, which supplies, at the secondary winding, the welding arc, the primary winding of said transformer being supplied by an inverter block with high-frequency electronic switches preceded by a block of clamping capacitors, said capacitors being supplied by an input rectifier stage, wherein said input rectifier stage has a unit power factor and is composed of at least one inductor, on a mains side, and of at least two diodes and at least two electronic switches, one for each diode, said switches being driven by a driver which renders the absorption of the input rectifier stage practically sinusoidal.

2. The generator according to claim 1, comprising a pair of diodes and a pair of electronic switches, one for each diode.

3. The generator according to claim 2, wherein in any conduction step the current circulates across a single diode and a single electronic switch.

4. The generator according to claim 1, wherein the current absorption on the mains side is sinusoidal.

5. The generator according to claim 1, comprising three inductors, three diodes and three electronic switches, one for each phase, driven by a driver which renders the absorption of the input rectifier stage practically sinusoidal.

* * * * *